(12) United States Patent
Park et al.

(10) Patent No.: US 10,350,978 B2
(45) Date of Patent: Jul. 16, 2019

(54) WATER DRAIN STRUCTURE OF SUNROOF IN VEHICLE

(71) Applicant: Hyundai Motor Company, Seoul (KR)

(72) Inventors: Jeong Hoon Park, Suwon-si (KR);
Chang Jin Yoon, Hwaseong-si (KR);
Ju Hun Lim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 166 days.

(21) Appl. No.: 15/587,171

(22) Filed: May 4, 2017

(65) Prior Publication Data

US 2018/0147920 A1 May 31, 2018

(30) Foreign Application Priority Data

Nov. 29, 2016 (KR) .......................... 10-2016-0159956

(51) Int. Cl.
*B60J 7/00* (2006.01)
*B60J 7/043* (2006.01)
*B62D 25/24* (2006.01)
*B60J 7/02* (2006.01)

(52) U.S. Cl.
CPC ............. *B60J 7/0084* (2013.01); *B60J 7/043* (2013.01); *B62D 25/24* (2013.01); *B60J 7/022* (2013.01)

(58) Field of Classification Search
CPC ....................................................... B60J 7/0084
USPC .............................................................. 296/213
See application file for complete search history.

(56) References Cited

U.S. PATENT DOCUMENTS

| | | | | |
|---|---|---|---|---|
| 4,964,247 A | * | 10/1990 | Spica | .................... E04D 13/076 52/11 |
| 8,449,025 B2 | * | 5/2013 | Boersma | ................ B60J 7/0084 296/213 |
| 2013/0333304 A1 | * | 12/2013 | Smith | ................... E04D 13/064 52/12 |

FOREIGN PATENT DOCUMENTS

KR 20100114769 A 10/2010

* cited by examiner

*Primary Examiner* — Dennis H Pedder
(74) *Attorney, Agent, or Firm* — Slater Matsil, LLP

(57) ABSTRACT

A water drain structure of a sunroof includes a pair of guide rails disposed in a longitudinal direction of a vehicle body at both ends of a roof panel. A front drip is coupled to front ends of the pair of guide rails, the front drip having a water drain channel. An inner rail is disposed in each of the guide rails. The inner rails form a path of the sunroof at both sides from a projection formed at a center region of the guide rails in the longitudinal direction and an outer rail for keeping rainwater. A storage unit is disposed at a portion of a rear end of the outer rail and is divided into a plurality of rainwater storage spaces to keep rainwater flowing therein.

18 Claims, 5 Drawing Sheets

WATER DRAIN STRUCTURE OF SUNROOF IN VEHICLE

CROSS-REFERENCE TO RELATED APPLICATIONS

This application claims the benefit of Korean Patent Application No. 10-2016-0159956 filed on Nov. 29, 2016, which application is hereby incorporated herein by reference.

TECHNICAL FIELD

Embodiments of the present disclosure relate to a water drain structure of a sunroof.

BACKGROUND

In general, the sunroof in the roof panel of a vehicle is provided for ventilation of the inside of the vehicle by opening a portion of the roof panel. That is, a sunroof is provided to allow more external air to flow into a vehicle when the inside of the vehicle is ventilated. A sunroof is composed of a frame disposed at the edge of an opening formed through a roof panel, a glass being movable inside the frame, and a sunshade slidably disposed under the glass.

Such a drain structure for discharging rainwater that flows into a gap between a roof panel and a sunroof when it rains is provided for the sunroof and includes a configuration for preventing rainwater from flowing into the sunroof.

That is, in order to prevent rainwater from flowing into a sunroof, in the related art, there is a configuration that guides rainwater into the outer rail of a guide rail and discharges the rainwater outside a vehicle through a drain channel.

However, when rainwater over the capacity of the outer rail flows into the outer rail of the guide rail, the rainwater may flow into the inner rail or into the vehicle.

While rainwater flowing in the outer rail is kept, the rainwater may flow into the inner rail that is the path from the outer rail to the sunshade by movement of the vehicle that is being driven. Further, the rainwater flowing in the inner rail may flow into the vehicle through the gap between the guide rail and the roof panel. Accordingly, the head lining in the vehicle may be contaminated or other parts may be corroded.

Korean patent application publication 10-2010-0114769 relates to subject matter discussed herein.

The above information disclosed in this Background section is only for enhancement of understanding of the background of the invention and therefore it may include information that does not form the prior art that is already known in this country to a person of ordinary skill in the art.

SUMMARY

Embodiments of the present disclosure relate to a water drain structure of a sunroof. Particular embodiments relate to a structure that is disposed outside a guide rail and keeps rainwater at a portion of the guide rail and a water drain structure of a sunroof for draining the kept rainwater through a front drip at the front of the guide rail.

Embodiments of the present invention can solve the above-described problems and can increase a space for keeping rainwater by dividing a space disposed outside a guide rail to keep rainwater into an upper space and a lower space.

Embodiments of the present invention provide a storage unit that has an upper space and a lower space separated from each other and prevents rainwater in the lower space from flowing into an inner rail and a vehicle. Other embodiments provide a water drain structure of a sunroof in which the front end and the rear end of a guide rail are separated and communicate with the rear side of an inner rail where a rainwater storage unit is disposed in order to integrally discharge rainwater.

Water drain structures of a sunroof according to various embodiments of the present invention include the following configurations.

In one aspect, the present invention provides a water drain structure of a sunroof that includes a pair of guide rails disposed in the longitudinal direction of a vehicle body at both ends of a roof panel. A front drip is coupled to the front ends of the pair of guide rails and having a water drain channel. An inner rail forms a path of the sunroof at both sides from a projection formed at the center in the longitudinal direction and an outer rail for keeping rainwater, in each of the guide rails. A storage unit is disposed at a portion of the rear end of the outer rail and divided into two or more rainwater storage spaces to keep rainwater flowing therein.

In an embodiment, the structure further includes a rear drip disposed at a position where the outer rail and the front end of the storage unit join, and connected to the front drip to discharge the rainwater kept in the storage unit.

In another embodiment, the rear drip is connected to the front drip through a storage drain channel.

In still another embodiment, the rainwater storage space is composed of an upper space and a lower space and is open at an end thereof such that the upper space and the lower space are in fluid communication with each other.

In yet another embodiment, the structure further includes a seal at the front of an opening of the roof panel.

In still yet another embodiment, the seal has ductility to be fixed with the sunroof in close contact.

In a further embodiment, the structure further includes a tapered seal positioned along the guide rails at both ends of the vehicle body and the front of an opening of the roof panel.

In another further embodiment, the front drip is locked to the water drain channel.

In still another further embodiment, the front drip is locked to the storage drain channel.

In yet another further embodiment, the structure further includes a storage cover for covering the upper portion of the storage unit.

In still yet another further embodiment, the storage unit has predetermined inclination such that the rear end is higher than the front end.

The present invention can obtain the following effects from the embodiments, and the configurations and combination and use relationships to be described below.

According to embodiments of the present invention, since the storage unit is divided into upper and lower spaces, it is possible to keep rainwater flowing into a vehicle in the spaces of the storage unit, so it is possible to prevent rainwater from flowing into a vehicle.

According to embodiments of the present invention, since drain channels communicate with the spaces of the storage unit to integrally discharge rainwater, it is possible to simplify the layout of the water drain structure of a sunroof.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
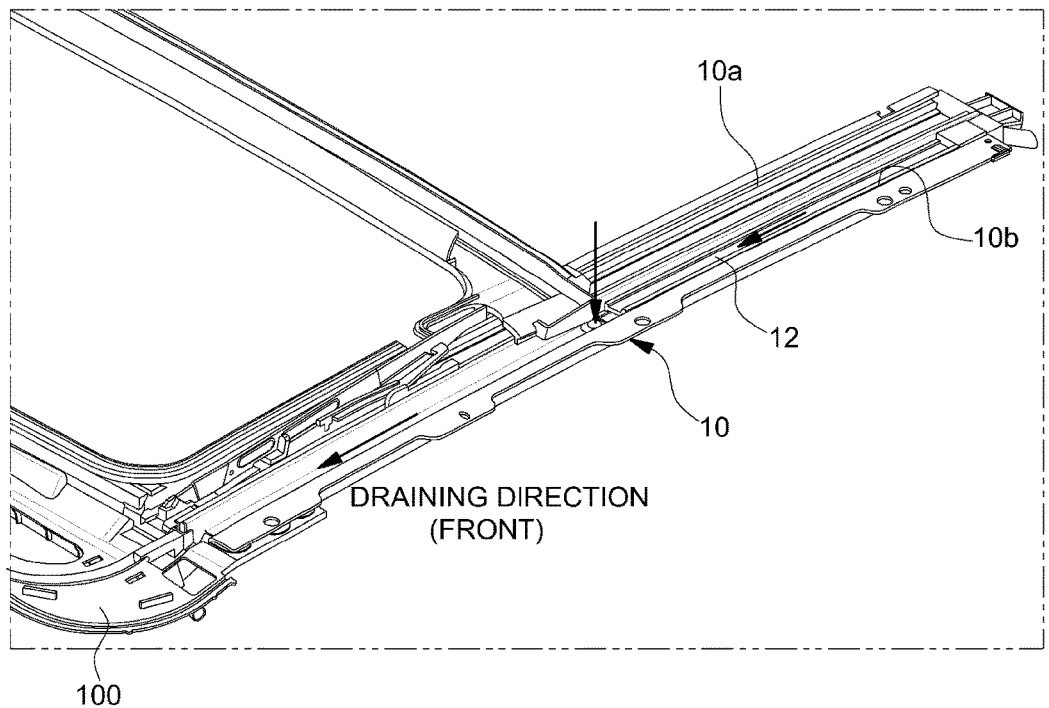
FIG. 1 is a perspective view illustrating a water drain structure of a sunroof as an embodiment of the present invention.

Reference numerals set forth in the drawings include reference to the following elements as further discussed below:

| | |
|---|---|
| 10: guide rail | 10a: inner rail |
| 10b: outer rail | 11: storage unit |
| 12: storage cover | 20: drain hole |
| 30: front drip | 40: seal |
| 50: tapered seal | 60: rear drip |
| 61: storage drain channel | 100: roof panel |
| 31: water drain channel | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the accompanying drawings. It should be understood that the present invention may be modified into various ways and the scope of the present invention is not limited to the following embodiments. The embodiments are provided for more completely explain the present invention to those skilled in the art.

In the specification, the terms ". . . unit" mean one unit for processing at least one function or operation and may be achieved by hardware, software, or a combination of hardware and software.

Hereinafter, embodiments of the present invention will be described with reference to the accompanying drawings.

The present invention relates to a water drain structure of a sunroof, that is, a rainwater drain structure which includes a moving lever that is moved forward and rearward in a vehicle by predetermined force and is disposed outside a guide rail 10 supporting the moving lever.

FIG. 1 is a perspective view of a guide rail 10 having a water drain structure of a sunroof as an embodiment of the present invention.

As illustrated in the figure, a sunroof includes an opening formed through a roof panel 100. Further, the sunroof (not illustrated) disposed at the opening of the roof panel 100 is supported by a moving lever and the moving lever opens/closes the sunroof by being moved forward/rearward by predetermined force.

When the moving lever is moved forward/rearward in a vehicle, it is supported by the guide rail 10 on the roof panel 100. That is, the guide rail 10 is disposed in the longitudinal direction of the vehicle to move the moving lever connected to the sunroof forward/rearward in the vehicle.

More preferably, the guide rail 10 is divided into an inner rail 10a and an outer rail 10b by a projection disposed at the center of the guide rail. The inner rail 10a supports the sunroof moving forward/rearward in contact with the moving lever and the outer rail 10b receives rainwater.

The present invention includes a storage unit 11 at a portion of the rear end of the outer rail 10b. The storage unit 11 includes at least two rainwater storage spaces in the height direction of the outer rail 10b.

More preferably, in an embodiment of the present invention, two rainwater storage spaces are vertically provided. The two rainwater storage spaces vertically disposed are in fluid communication with each other at least at one end where the storage unit 11 is positioned. The water storage unit 11 may be made of plastic and fixed to the outer rail 10b.

In an embodiment of the present invention, inclination may be provided so that the water kept in the storage unit 11 can be discharged to a front drip 30 at the front end of the outer rail 10b, and the height of the rear end of the storage unit 11 may be larger than the front end of the storage unit 11.

By the storage unit 11 formed in this way, rainwater flowing outside of the guide rail 10 and kept therein can be kept in the lower space and the upper space of the storage unit 11 and the kept rainwater flows to the front end of the guide rail 10 by the configuration of the storage unit 11, so it can be discharged outside the vehicle through the front drip 30 including a water drain channel 31.

That is, the water drain channel 31 may be inserted in a pillar of the vehicle to be in fluid communication with the outside of the vehicle to discharge the rainwater flowing into the guide rail 10 of the sunroof outside the vehicle.

Figure 2:
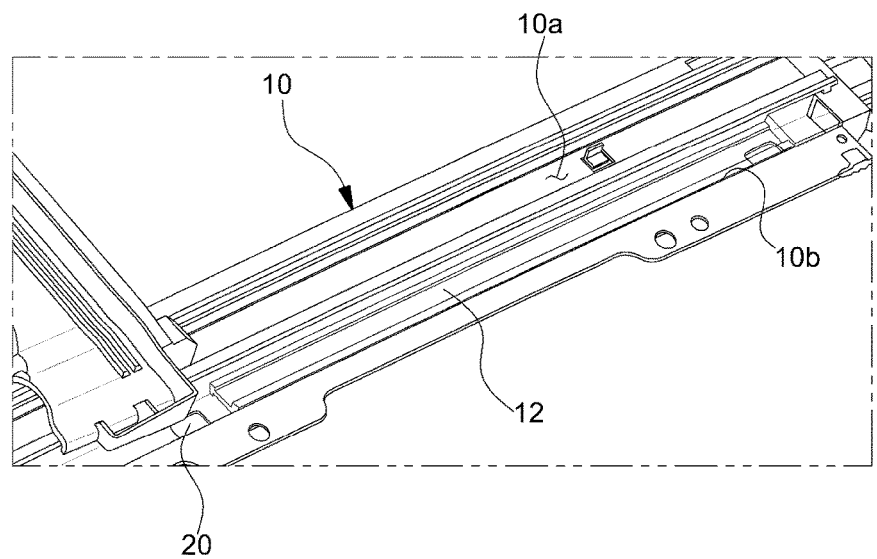
FIG. 2 is a perspective view illustrating a guide rail of the water drain structure of a sunroof as an embodiment of the present invention.

FIG. 2 is a view illustrating the configuration of the guide rail 10 as an embodiment of the present invention.

As illustrated in the figure, the inner rail boa and the outer rail bob are separated by the projection of the guide rail 10 and the moving lever for moving the sunroof is disposed on the inner rail 10a, so the inner rail supports the moving lever when the sunroof is moved.

The storage unit 11 is disposed at a portion of the rear end of the outer rail 10b and it can keep rainwater flowing into the guide rail 10.

More preferably, according to the configuration of the outer rail 10b and the storage unit 11, the storage unit 11 can provide an upper space and a lower space that can keep rainwater and can prevent rainwater from flowing into the vehicle even under bad situations (over a predetermined condition determined in accordance with the amount of rainfall).

The upper space and the lower space are separated by the configuration of the storage unit 11 at the outer rail 10b, and the upper space and the lower space may be in fluid communication with each other at least at one end of the storage unit 11. More preferably, the upper space and the lower space that are spaces for keeping rainwater may include a shape that is open at the front end of the storage unit 11 and may be in fluid communication with each other at the front end where the storage unit 11 and the outer rail 10b join.

As another embodiment of the present invention, it may include a drain hole 20 positioned at front ends of the inner rail 10a and the storage unit 11, and a storage drain channel 61 may be provided so that the front drip 30 and the drain hole 20 are in fluid communication with each other.

Figure 3:
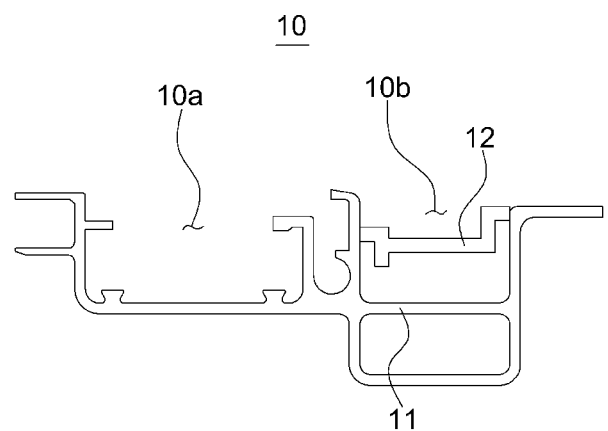
FIG. 3 is a cross-sectional view illustrating the guide rail of the water drain structure of a sunroof as an embodiment of the present invention.

FIG. 3 is a side cross-sectional view of the guide rail 10 as an embodiment of the present invention.

As illustrated in the figure, the outer rail 10b may be divided into an upper space and a lower space by the configuration of the storage unit 11.

A storage cover 12 may be provided to cover the top of the storage unit 11 and is disposed over the space divided into the upper and lower spaces by the configuration of the storage unit 11, so it is possible to prevent the rainwater kept in the upper space from flowing into the vehicle or the inner rail 10a.

That is, as described above, the upper space of the present invention may be covered tightly by the storage cover 12 and the lower space may be covered tightly by the rear side of the storage unit 11 and the outer rail 10b.

As illustrated in the figure, the upper space and the lower space of the outer rail 10b are divided by the configuration of the storage unit 11, so a configuration for keeping rainwater can be provided. Further, the upper space and the lower space communicate with each other and may be open at least one of both ends of the storage unit 11.

In an embodiment of the present invention, the upper space and the lower space may be open at the end where the storage unit 11 and the outer rail 10b join.

The storage unit 11 may be inclined toward the front end from the rear end so that the rainwater kept in the upper space can flow to the front end of the storage unit. More preferably, the outer rail 10b may also be inclined from the rear end to the front end so that the rainwater flowing in the lower space can also flow to the front end of the storage unit 11.

More preferably, the storage unit 11 may be higher at the rear end than the front end and the outer rail 10b may also be higher at the rear end than the front end.

As described above, the rainwater flowing into the upper space and the lower space of the rainwater storage space can flow from the rear end to the front end of the storage unit 11 and it communicates with the front drip 30 (fluid communication) at the front end of the outer rail 10b.

Figure 4:
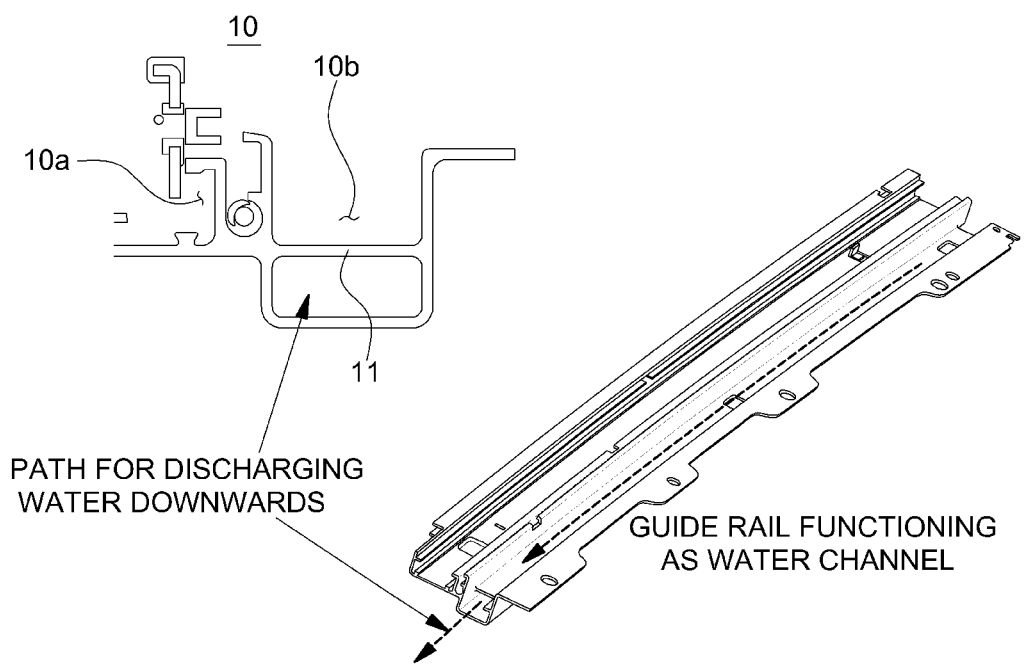
FIG. 4 is a view illustrating a flow path of rainwater kept in the guide rail as an embodiment of the present invention.

FIG. 4 illustrates a path through which the rainwater flowing in the storage unit 11 is discharged, as an embodiment of the present invention.

As illustrated in the figure, the storage unit 11 is positioned at a portion of the outer rear end of the rail and the rainwater storage space including an upper space and a lower space is formed by the storage unit 11. Further, the rear ends of the storage unit 11 and the outer rail 10b where the storage unit 11 is positioned are higher than the front ends thereof so that rainwater flowing therein flows to the front end of the outer rail 10b where the storage unit 11 is positioned.

As illustrated in the figure, FIG. 4 illustrates the configuration in which rainwater flowing therein flows from the rear end of the outer rail 10b at the right upper portion to the front end of the outer rail 10b at the left lower portion.

That is, the rainwater storage space for keeping rainwater is formed by the storage unit 11 positioned at a portion of the rear end of the outer rail 10b. The rainwater storage space including the upper space and the lower space formed by the storage unit 11, as described above, keeps rainwater flowing therein, the rainwater kept in the upper space and the lower space communicates with each other, and an end of the storage unit 11 is open.

More preferably, the front end of the storage unit 11 including the rainwater storage space is open so that the rainwater kept in the upper space and the rainwater kept in the lower space communicate with each other (fluid communication).

As described with reference to FIG. 3, an embodiment of the present invention is configured to be able to discharge rainwater kept in the upper space and the lower space through the front drip 30 at the front end of the outer rail 10b.

In another embodiment of the present invention, a drain hole 20 is formed at a position where the front end of the storage unit 11 and the outer rail 10b face each other and a rear drip 60 connected to the drain hole 20 may be provided. The rear drip 60 and the front drip 30 may communicate with each other by the storage drain channel 61.

Figure 5:
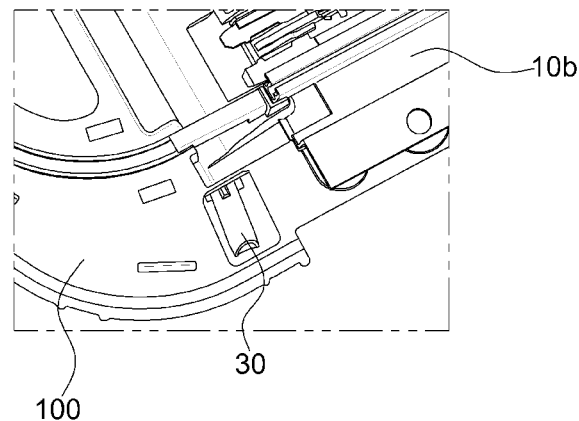
FIG. 5 is a view illustrating a front drip on a roof panel as an embodiment of the present invention.

FIG. 5 illustrates the configuration of the front drip 30 as an embodiment of the present invention.

As described in the figure, the front drip 30 is positioned at the front end of the outer rail 10b and is configured to guide the rainwater kept in the outer rail 10b to the outside of a vehicle.

The front drip 30 is connected to a water drain channel 31 so that the kept rainwater can be discharged outside the vehicle through the water drain channel 31. More preferably, the front drip 30 can be connected through the water drain channel 31 and the storage drain channel 61 connected from the rear drip 60 and has projections at the joints of the front drip 30 and the channels, so the drain channels can be forcibly fitted by the projections.

The water drain channel 31 of the present invention can be inserted in a pillar of a vehicle to communicate with the bottom of the vehicle, so the rainwater kept in the outer rail 10b and flowing into the front drip 30 can be discharged to the bottom of the vehicle.

Figure 6:
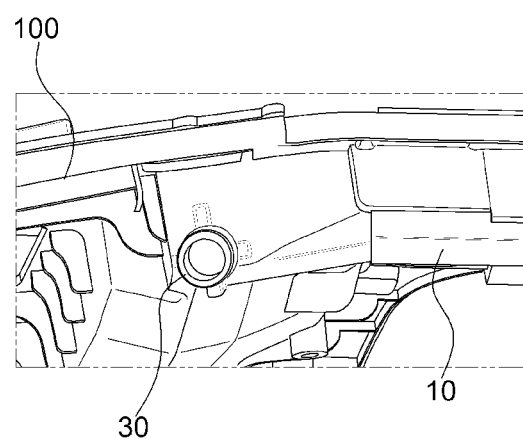
FIG. 6 is a bottom view of the front drip on a roof panel as an embodiment of the present invention.

FIG. 6 illustrates the front drip 30 on the roof panel 100 as an embodiment of the present invention.

As illustrated in the figure, the front drip 30 protrudes from the roof panel 100 in a downward direction of the vehicle. Further, the front drip 30 is coupled to the water drain channel 31 to discharge the rainwater kept in the outer rail 10b to the bottom of the vehicle.

More preferably, the front drip +can be locked to the water drain channel 31 and the storage drain channel 61 and may have projections at the joints to the channels.

Figure 7:
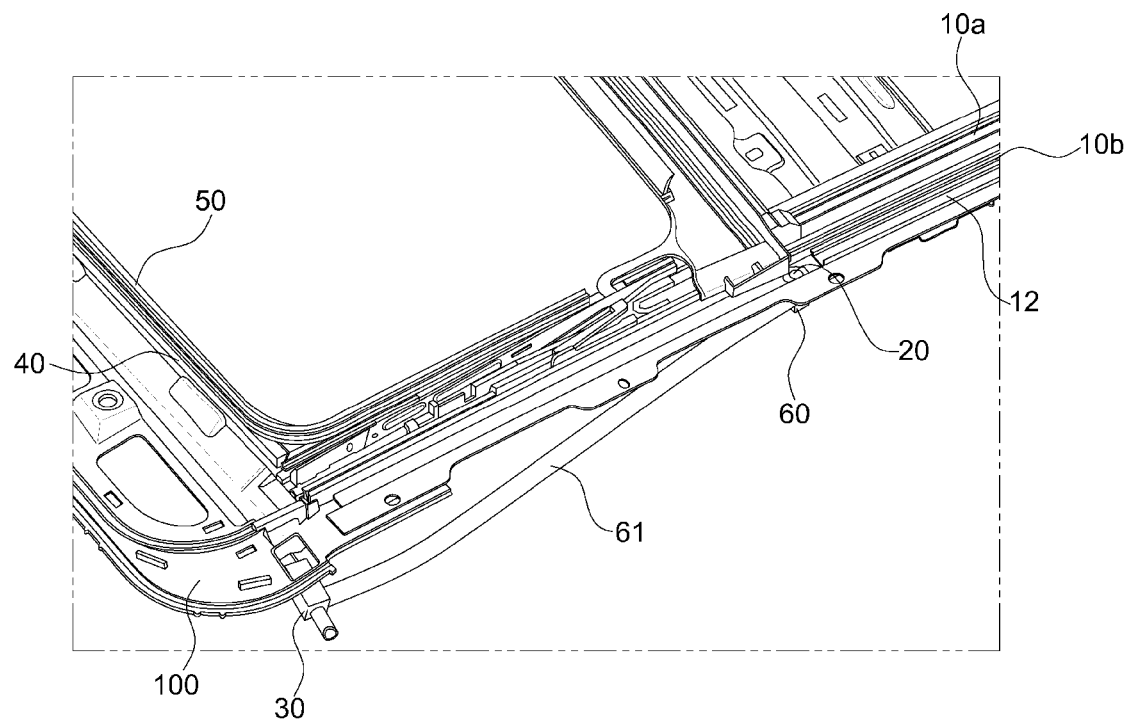
FIG. 7 is a perspective view illustrating a water drain structure of a sunroof as another embodiment of the present invention.

FIG. 7 illustrates, as another embodiment of the present invention, a drain hole 20 at the joint of the front end of the storage unit 11 and the outer rail 10b, in which the front drip 30 and the drain hole 20 communicate with each other (fluid communication).

As illustrated in the figure, as another embodiment of the present invention, the drain hole 20 is formed at the joint of the front end of the storage unit 11 and the outer rail 10b, and the rear drip 60 is coupled under the drain hole 20. The rear drip 60 is configured to guide the rainwater kept in the drain hole 20 to the front drip 30, and the rear drip 60 and the front drip 30 communicate with each other through the storage drain channel 61.

As described above, in the embodiment illustrated in the figure, rainwater flowing inside is kept by the rainwater storage space divided into the upper space and the lower space by the storage unit 11 and the kept rainwater can move to the front end of the storage unit 11 and flow into the drain hole 20. The rainwater flowing in the drain hole 20 flows into the storage drain channel 61 through the rear drip 60 and is discharged outside the vehicle through the front drip 30 connected to the storage drain channel 61.

The storage drain channel 61 can be forcibly fitted to the front drip 30 and the rear drip 60 and can be coupled to them in common fastening ways.

In order to prevent rainwater from flowing into the roof panel 100, a seal 40 positioned at the front end of the opening of the roof panel 100 may be further provided. Further, a tapered seal 50 surrounding portions of the inside of both inner rails 10a and the front end of the roof panel 100 may be further provided.

That is, the tapered seal and the seal 40 for preventing rainwater from flowing into the opening of the roof panel 100 are illustrated.

The tapered seal 50 surrounds a portion of the opening of the roof panel 100 and surrounds a portion of the inner side of the guide rail 10. Further, it may be positioned along the front end of the opening, and more preferably, it may be positioned on the seal 40.

The tapered seal 50 and the seal 40 may be closed tightly even though the sunroof is closed, so they may be made of a ductile material. That is, the seal 40 and the tapered seal 50 surrounding a portion of the opening of the roof panel 100 may be covered tightly by the sunroof when the sunroof is closed.

Figure 8:
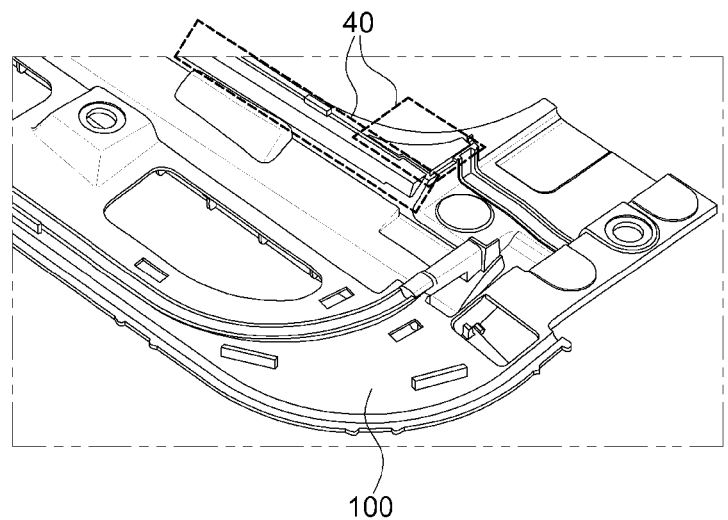
FIG. 8 is a view illustrating a seal on a roof panel as an embodiment of the present invention.

FIG. 8 illustrates the seal 40 at the front end of the roof panel 100 described above.

The seal 40 is positioned at the front of the opening of the roof panel 100 and may be formed by extrusion. The seal 40 configured as described above can prevent rainwater from flowing into the front of the opening and guide the rainwater flowing to the front end of the roof panel 100 to the front drip 30.

Figure 9:
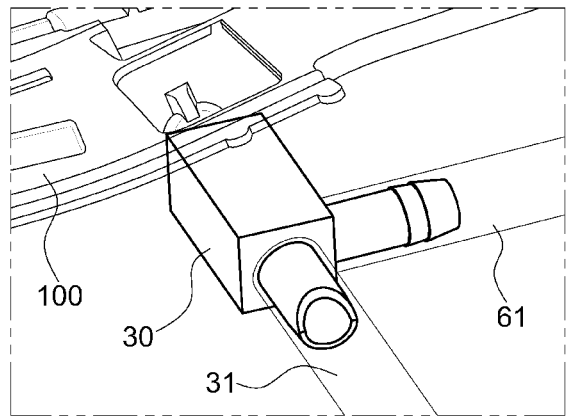
FIG. 9 is an enlarged view of a front drip as an embodiment of the present invention.

FIG. 9 illustrates the front drip 30 as another embodiment of the present invention.

As illustrated in the figure, the front drip 30 of the present invention has two projections. One projection positioned in the longitudinal direction of the vehicle is fastened to the storage drain channel 61 to communicate with the rear drip 60 at the middle portion of the guide rail 10 so that the rainwater kept by the storage unit 11 flows inside.

The other projection may be positioned toward the bottom of the vehicle in order to discharge the rainwater flowing into the outer rail 10b to the outside of the bottom of the vehicle.

A locking protrusion may be formed at the projection to keep the storage drain channel 61 and the water drain channel 31 locked.

Figure 10:
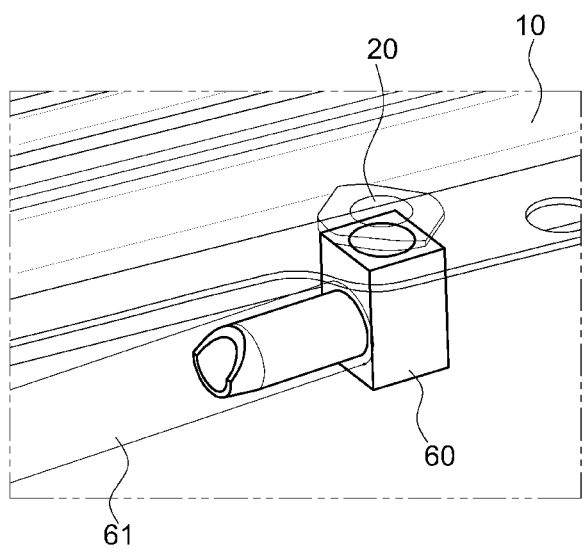
FIG. 10 is an enlarged view of a rear drip as an embodiment of the present invention.

FIG. 10 illustrates the configuration of the rear drip 60 as an embodiment of the present invention.

As illustrated in the figure, the rear drip 60 communicates with the drain hole 20 positioned at the outer guide rail 10 and is coupled to the storage drain channel 61 so that the rainwater kept in the outer rail 10b flows to the front drip 30.

The rear drip 60 may be locked to the storage drain channel 61 and may be forcibly fitted. However, the storage drain channel 61 and the rear drip 60 are coupled not only in the ways described above and may be coupled to communicate with each other by those skilled in the art.

The rear drip 60 is configured so that the rainwater kept by the storage unit 11 flows into it and may be positioned at the position corresponding to the drain hole 20 where the front end of the storage unit 11 and the outer rail 10b join. Accordingly, the rainwater kept in the rainwater storage space divided into the upper space and the lower space by the storage unit 11 can flow to the front end of the storage unit 11 and the rainwater flowing in this way can flow into the rear drip 60 through the drain hole 20 where the front end of the storage unit 11 and the outer rail 10b join.

The rainwater flowing inside in this way flows to the front drip 30 through the storage drain channel 61 coupled to the rear drip 60 and flows outside the vehicle through the water drain channel 31 communicating with the front drip 30.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A water drain structure of a sunroof, the structure comprising:
   a pair of guide rails disposed in a longitudinal direction of a vehicle body at both ends of a roof panel;
   a front drip coupled to front ends of the pair of guide rails, the front drip having a water drain channel;
   an inner rail in each of the guide rails, the inner rail forming a path of the sunroof at both sides from a projection formed at a center region of the guide rails in the longitudinal direction and an outer rail for keeping rainwater; and a storage unit disposed at a portion of a rear end of the outer rail and divided into a plurality of rainwater storage spaces to keep rainwater flowing therein, wherein each rainwater storage space includes an upper space capped by an imperforate cover and a lower space divided by a plate with a major surface parallel to the vehicle body, the rainwater storage space being open at an end of the rainwater storage space such that the upper space and the lower space are in fluid communication with each other.

2. The structure of claim 1, further comprising a rear drip disposed at a position where the outer rail and a front end of the storage unit join, the rear drip connected to the front drip to discharge the rainwater kept in the storage unit.

3. The structure of claim 2, wherein the rear drip is connected to the front drip through a storage drain channel.

4. The structure of claim 3, wherein the front drip is locked to the storage drain channel.

5. The structure of claim 1, further comprising a seal disposed at the front of an opening of the roof panel.

6. The structure of claim 5, wherein the seal has ductility to be fixed with and contact the sunroof.

7. The structure of claim 1, further comprising a tapered seal positioned along the guide rails disposed at both ends of the vehicle body and the front of an opening of the roof panel.

8. The structure of claim 1, wherein the front drip is locked to the water drain channel.

9. The structure of claim 1, further comprising a storage cover for covering an upper portion of the storage unit.

10. The structure of claim 1, wherein the storage unit has predetermined inclination such that a rear end of the storage unit slopes toward the front end of the storage unit.

11. A water drain structure of a sunroof, the structure comprising:
   a pair of guide rails disposed in a longitudinal direction of a vehicle body at both ends of a roof panel;
   a front drip coupled to front ends of the pair of guide rails, the front drip having a water drain channel;
   an inner rail in each of the guide rails, the inner rail forming a path of the sunroof at both sides from a projection formed at a center region of the guide rails in the longitudinal direction and an outer rail for keeping rainwater;
   a storage unit disposed at a portion of a rear end of the outer rail and divided into a plurality of rainwater storage spaces to keep rainwater flowing therein, wherein each rainwater storage space includes an upper space and a lower space divided by a plate with a major surface parallel to the vehicle body, the rainwater storage space being open at an end of the rainwater storage space such that the upper space and the lower space are in fluid communication with each other;
   an imperforate storage cover for covering an upper portion of the storage unit; and
   a rear drip disposed at a position where the outer rail and a front end of the storage unit join, the rear drip connected to the front drip to discharge the rainwater kept in the storage unit.

12. The structure of claim 11, wherein the rear drip is connected to the front drip through a storage drain channel.

13. The structure of claim 12, wherein the front drip is locked to the storage drain channel.

14. The structure of claim 11, further comprising a seal disposed at the front of an opening of the roof panel.

15. The structure of claim 14, wherein the seal has ductility to be fixed with and contact the sunroof.

16. The structure of claim 11, further comprising a tapered seal positioned along the guide rails disposed at both ends of the vehicle body and the front of an opening of the roof panel.

17. The structure of claim 11, wherein the front drip is locked to the water drain channel.

18. A water drain structure of a sunroof, the structure comprising:
   a pair of guide rails disposed in a longitudinal direction of a vehicle body at both ends of a roof panel;
   a front drip coupled to front ends of the pair of guide rails, the front drip having a water drain channel;
   an inner rail in each of the guide rails, the inner rail forming a path of the sunroof at both sides from a projection formed at a center region of the guide rails in the longitudinal direction and an outer rail for keeping rainwater;
   a storage unit disposed at a portion of a rear end of the outer rail and divided into a plurality of rainwater storage spaces to keep rainwater flowing therein, wherein each rainwater storage space includes an upper space and a lower space divided by a plate with a major surface parallel to the vehicle body, the rainwater storage space being open at an end of the rainwater storage space such that the upper space and the lower space are in fluid communication with each other;
   an imperforate storage cover for covering an upper portion of the storage unit; and
   a rear drip disposed at a position where the outer rail and a front end of the storage unit join, the rear drip connected to the front drip to discharge the rainwater kept in the storage unit,
   wherein the storage unit has predetermined inclination such that a rear end of the storage unit slopes toward the front end of the storage unit.

* * * * *